(12) United States Patent
Shatsky

(10) Patent No.: US 11,386,048 B2
(45) Date of Patent: Jul. 12, 2022

(54) APPARATUS, SYSTEMS, AND METHODS FOR CRYPTO-ERASING DEDUPLICATED DATA

(71) Applicant: International Business Machines Corporation, Armonk, NY (US)

(72) Inventor: Yosef Shatsky, Karnei Shomron (IL)

(73) Assignee: International Business Machines Corporation, Armonk, NY (US)

( * ) Notice: Subject to any disclaimer, the term of this patent is extended or adjusted under 35 U.S.C. 154(b) by 820 days.

(21) Appl. No.: 16/276,599

(22) Filed: Feb. 14, 2019

(65) Prior Publication Data

US 2020/0265021 A1 Aug. 20, 2020

(51) Int. Cl.
*G06F 16/174* (2019.01)
*H04L 9/08* (2006.01)
*G06F 3/06* (2006.01)

(52) U.S. Cl.
CPC ........ *G06F 16/1752* (2019.01); *G06F 3/0623* (2013.01); *G06F 3/0641* (2013.01); *G06F 3/0683* (2013.01); *H04L 9/08* (2013.01)

(58) Field of Classification Search
CPC .. G06F 16/1752; G06F 3/0623; G06F 3/0641; G06F 3/0683; H04L 9/08
See application file for complete search history.

(56) References Cited

U.S. PATENT DOCUMENTS

| | | | |
|---|---|---|---|
| 6,249,866 B1 | 6/2001 | Brundrett et al. | |
| 8,433,901 B2* | 4/2013 | De Atley | G06F 21/575 713/193 |
| 9,092,370 B2 | 7/2015 | Schmier et al. | |
| 9,363,085 B2 | 6/2016 | Offenberg et al. | |
| 9,430,164 B1 | 8/2016 | Botelho et al. | |
| 2005/0195975 A1* | 9/2005 | Kawakita | H04L 9/3236 380/30 |
| 2010/0250497 A1* | 9/2010 | Redlich | H04L 63/105 707/661 |
| 2016/0078245 A1* | 3/2016 | Amarendran | G06N 20/00 713/193 |
| 2017/0012949 A1* | 1/2017 | Boren | H04L 63/045 |
| 2020/0076593 A1* | 3/2020 | Pyo | G06F 21/602 |

OTHER PUBLICATIONS

Anonymous, "Data Security—Encryption and Data Elimination", Smart Storage System, Application Note AN006, Mar. 2012, pp. 1-12.
Fabiano C. Botelho et al., "Memory Efficient Sanitization of a Deduplicated Storage System", 11th USENIX Conference on File and Storage Technologies, FAST vol. 13 , 2013, pp. 81-94.
Anonymous, "Seagate Instant Secure Erase Deployment Options", www.seagate.com, Copyright in 2012, pp. 1-5.

* cited by examiner

*Primary Examiner* — Henry Tsai
*Assistant Examiner* — John B Roche
(74) *Attorney, Agent, or Firm* — Kunzler Bean & Adamson

(57) ABSTRACT

Methods that can crypto-erase deduplicated data are disclosed herein. One method includes encrypting, by a processor, each data chunk on a storage device with a unique first encryption key that is different from each other first encryption key and encrypting each storage object on the storage device with a unique second encryption key that is different from each first encryption key and each other second encryption key in which each second encryption key encrypts a first encryption key for a data chunk. Apparatus, systems, and computer program products that can include, perform, and/or implement the methods are also disclosed herein.

20 Claims, 15 Drawing Sheets

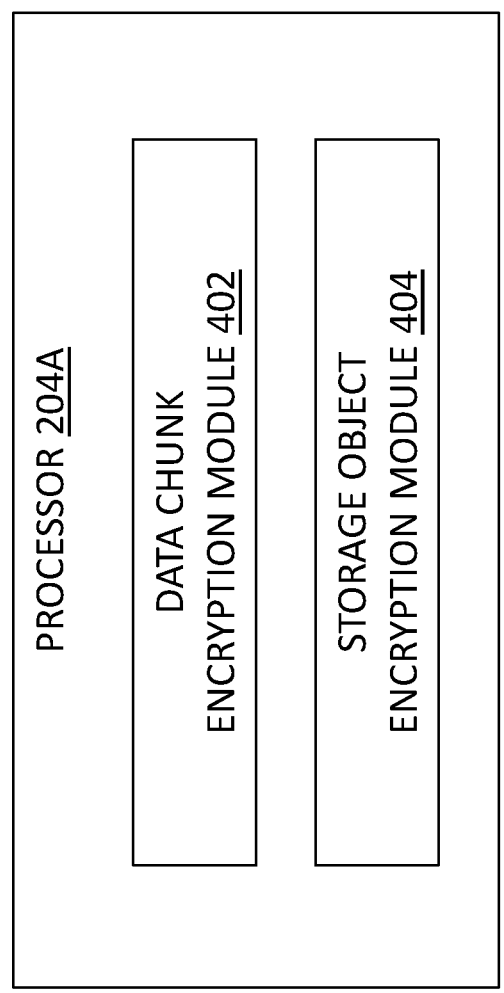

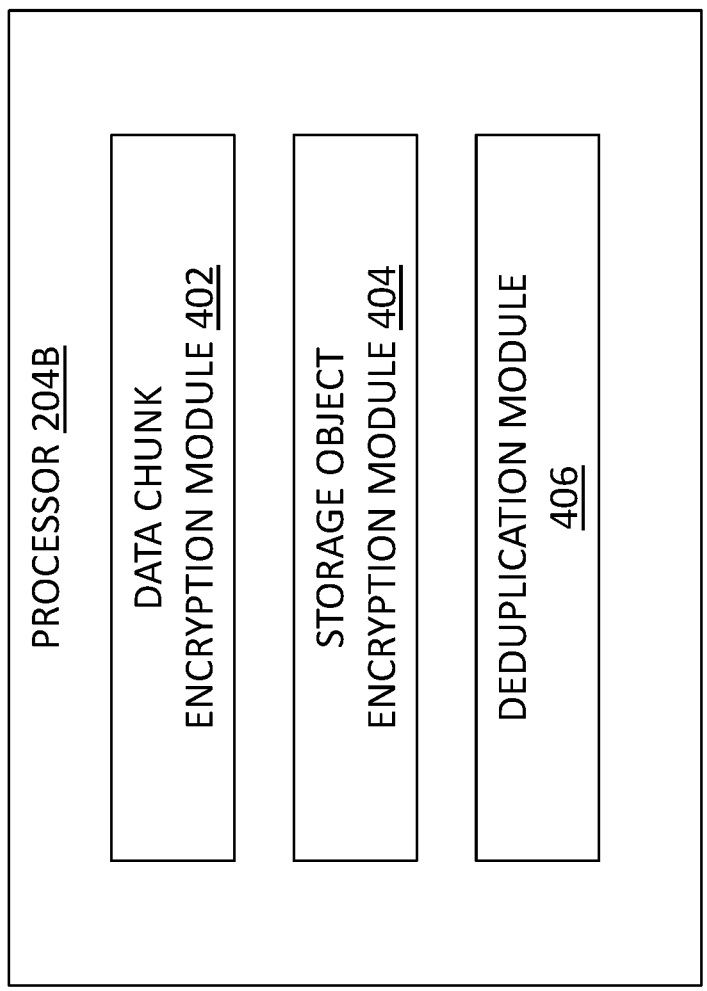

APPARATUS, SYSTEMS, AND METHODS FOR CRYPTO-ERASING DEDUPLICATED DATA

FIELD

The subject matter disclosed herein relates to storage systems and, more particularly, relates to apparatus, systems, and methods that can crypto-erase deduplicated data.

BACKGROUND

Data security can be a fundamental requirement in storage systems. A primary aspect of data security is the encryption of data stored on drives. Data centers may use Self Encrypting Device (SED) drives that have built-in encryption capabilities. SED drives can be divided in to a limited number of areas (e.g., bands/locking ranges), each of which is encrypted using a different key, and can be secure erased individually. SEDs implement secure erasure by discarding the encryption key that was used to encrypt the data, which can be referred to as a "crypto-erase" technique. Here, the data itself is not actually erased, but instead, is simply made cryptographically undecipherable.

In addition to data security, conventional storage systems often implement a deduplication process/technique to increase storage efficiency by reducing the amount of storage space required to store duplicates of data. Data deduplication identifies data that are duplicates of one another and saves one version of the data (e.g., primary version). Each duplicate of the primary version is replaced with a respective pointer (e.g., reference) to the primary version instead of storing the duplicate itself, which reduces the amount of storage space consumed by the duplicate because a pointer is typically smaller than a duplicate of the data.

BRIEF SUMMARY

Apparatus, systems, and methods that can crypto-erase deduplicated data are provided. One apparatus includes a first encryption module that encrypts each data chunk on a storage device with a unique first encryption key that is different from each other first encryption key and a second encryption module that encrypts each storage object on the storage device with a unique second encryption key that is different from each first encryption key and each other second encryption key. In some embodiments, each second encryption key encrypts a first encryption key for a data chunk. In additional or alternative embodiments, at least a portion of the module and/or the reference management module comprises one or more of a set of hardware circuits, a set of programmable hardware devices, and/or executable code stored on a set of non-transitory computer-readable storage media.

A method includes encrypting, by a processor, each data chunk on a storage device with a unique first encryption key that is different from each other first encryption key and encrypting each storage object on the storage device with a unique second encryption key that is different from each first encryption key and each other second encryption key. In some embodiments, each second encryption key encrypts a first encryption key for a data chunk.

One computer program product includes a computer-readable storage medium including program instructions embodied therewith. The program instructions are executable by a processor to cause the processor to encrypt each data chunk on a storage device with a unique first encryption key that is different from each other first encryption key and encrypt each storage object on the storage device with a unique second encryption key that is different from each first encryption key and each other second encryption key. In some embodiments, each second encryption key encrypts a first encryption key for a data chunk.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which:

FIGS. 4A and 4B are block diagrams of various embodiments of a processor included in the storage system of FIG. 2;

DETAILED DESCRIPTION

Figure 1:
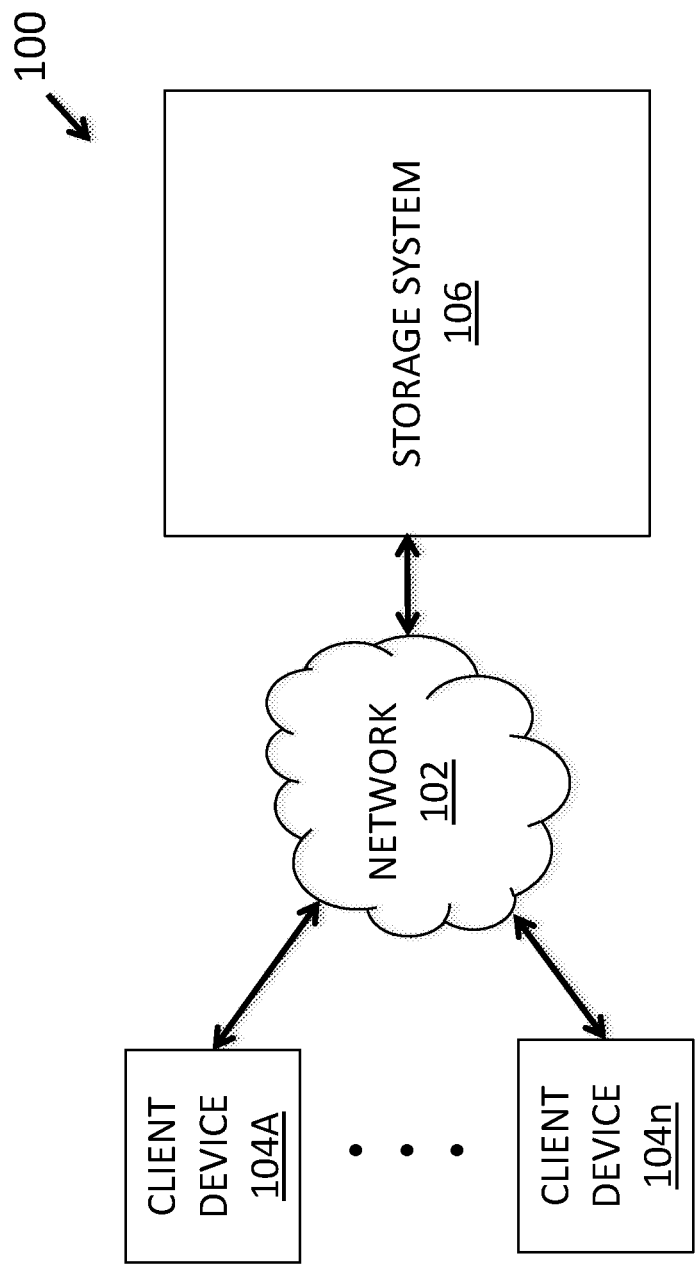
FIG. 1 is a block diagram of one embodiment of a storage network.

Disclosed herein are various embodiments providing apparatus, systems, methods, and computer program products that can crypto-erase data. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure below may refer to elements of proceeding figures. For instance, like numbers can refer to similar elements in all figures, including alternate embodiments of similar elements.

With reference now to the drawings, FIG. 1 is a block diagram of one embodiment of a storage network 100 (or system) including a network 102 connecting a set of client devices 104A through 104*n* (also simply referred individually, in various groups, or collectively as client device(s) 104) and a storage system 106. The network 102 may be any suitable wired and/or wireless network 102 (e.g., public and/or private computer networks in any number and/or configuration (e.g., the Internet, an intranet, a cloud network, etc.)) that is known or developed in the future that enables the set of storage devices 104 and the storage system 106 to be coupled to and/or in communication with one another and/or to share resources. In various embodiments, the network 102 can comprise a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources that are possible and contemplated herein.

A client device 104 can be any suitable computing hardware and/or software (e.g., a thick client, a thin client, or hybrid thereof) capable of accessing the storage system 100 via the network 102. Each client device 104, as part of its respective operation, relies on sending I/O requests to the storage system 106 to write data, read data, and/or modify data. Specifically, each client device 104 can transmit 110 requests to read, write, store, communicate, propagate, and/or transport instructions, data, computer programs, software, code, routines, etc., to the storage system 106 and may comprise at least a portion of a client-server model. In general, the storage system 106 can be accessed by the client device(s) 104 and/or communication with the storage system 106 can be initiated by the client device(s) 104 through a network socket (not shown) utilizing one or more inter-process networking techniques.

Figure 2:
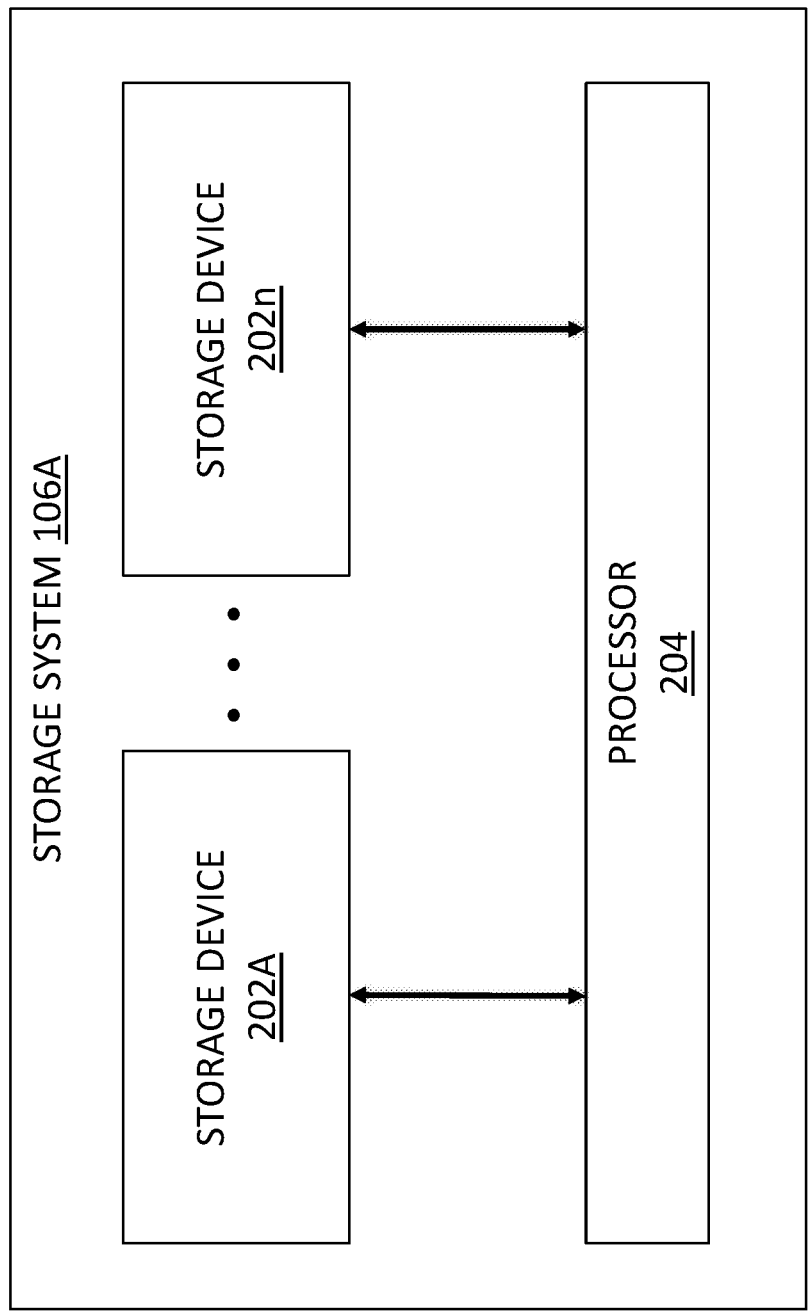
FIG. 2 is a block diagram of one embodiment of a storage system included in the storage network of FIG. 1.

Referring to FIG. 2, FIG. 2 is a block diagram of one embodiment of one embodiment of a storage system 106A illustrated in and discussed with reference to FIG. 1. At least in the illustrated embodiment, the storage system 106A includes, among other components, a set of storage devices 202A through 202*n* (also simply referred individually, in various groups, or collectively as storage device(s) 202) and a processor 204 coupled to and/or in communication with one another.

Figure 3:
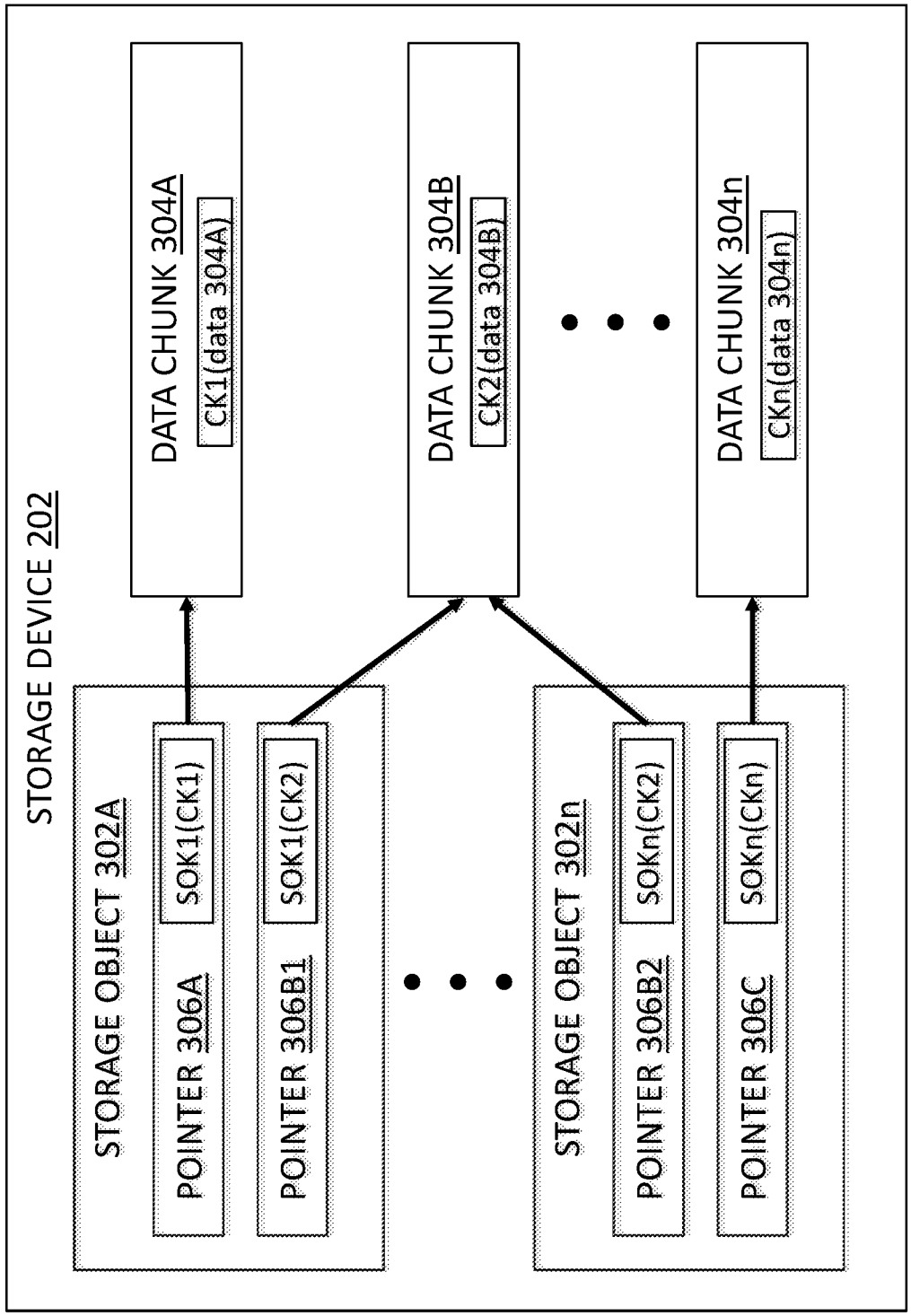
FIG. 3 is a block diagram of one embodiment of a storage device included in the storage system of FIG. 2.

With reference to FIG. 3, FIG. 3 is a block diagram of one embodiment of a storage device 202 illustrated in and discussed with reference to FIG. 2. A storage device 202 may include any suitable type of device and/or system that is known or developed in the future that can store computer-useable data. In various embodiments, a storage device 202 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

In some embodiments, a storage device 202 may be implemented as a direct-access storage device (DASD). A storage device 202, in further embodiments, may include other types of non-transitory memory such as, for example, flash memory (e.g., a solid-state devices (SSD) or other non-volatile storage devices that store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) of memory devices (e.g., non-volatile and/or persistent), etc. that are possible and contemplated herein.

A storage device 202 may include any suitable size that can provide storage space for one or more storage applications for a set of client devices 104. A storage device 202, in various embodiments, can include a size in the range of about sixty-four kilobytes (64 KB) to about one hundred terabytes (100 TB), among other sizes that are possible and contemplated herein. In some embodiments, a storage device 202 can include a size of about one terabyte, among other sizes that are possible and contemplated herein.

At least in the illustrated embodiment, a storage device 202 can store, among other data, a plurality of storage objects 302A through 302n (also simply referred individually, in various groups, or collectively as storage object(s) 302)). In additional or alternative embodiments, a storage device 202 can store a set of data chunks 304A through 304n (also simply referred individually, in various groups, or collectively as data chunk(s) 304) that are owned by and/or are associated with the storage object(s) 302.

A storage object 302 may include any suitable storage object 302 that is known or developed in the future. In various embodiments, a storage object can include a storage volume, a storage pool, a domain, a file, and/or a directory, etc., among other types of storage objects 302 that are possible and contemplated herein. In some embodiments, a storage object 302 can store a set of pointers 306A through 306C (also simply referred individually, in various groups, or collectively as pointer(s) 306), which can also be referred to as data references or references. The pointers 306 can include any suitable size that is known or developed in the future.

The pointers 306 may be stored on storage objects 302A through 302n and may be included as a portion of a data deduplication technique and/or process. The data deduplication technique and/or process may include any suitable deduplication process/technique that is known or developed in the future that can reduce the amount of data stored in a storage device 202 by replacing one or more duplicates of a data chunk 304 with a pointer 306 to a version of the data chunk 304 (e.g., primary version of the data chunk 304 or primary data chunk 304) instead of storing the duplicate itself.

As illustrated in FIG. 3, storage object 302A includes a pointer 306A that references data chunk 304A and a pointer 306B1 that references data chunk 304B. Further, storage object 302B includes a pointer 306B2 that references data chunk 304B and a pointer 306C that references data chunk 304n. While FIG. 3 illustrates two storage objects 302, various other storage devices 202 may include a greater quantity of storage objects 302.

A data chunk 304 may include any suitable chunk of data, segment of data, and/or block of data. Further, a data chunk 304 may include any suitable type of data that is known or developed in the future.

Each data chunk 304 may include any suitable size that is known or developed in the future. In various embodiments, each data chunk may include a size in the range of about 2 KB to about 64 KB, among other sizes that are possible and contemplated herein. In some embodiments, a data chunk 304 can include a size of about 8 KB, among other sizes that are possible and contemplated herein.

While the embodiment illustrated in FIG. 3 includes three data chunks 304, various other embodiments may include different quantities of data chunks 304 and is not limited to three data chunks 304. In other words, various alternative embodiments may include two data chunks 304 or any quantity of data chunks 304 greater than three data chunks 304.

In various embodiments, each of data chunks 304A through 304n is encrypted/decrypted using a data chunk encryption key (CK) that is different from the CK assigned to every other data chunk 304 (e.g., a unique CK). At least in the embodiment illustrated in FIG. 3, data chunk 304A is encrypted/decrypted using a data chunk encryption key CK1, data chunk 304B is encrypted/decrypted using a data chunk encryption key CK2, and data chunk 304n is encrypted/decrypted using a data chunk encryption key CKn.

A data chunk encryption key CK may include any suitable encryption algorithm and/or technique that is known or developed in the future that can encrypt and/or decrypt a data chunk 304. Further, a data chunk encryption key CK can include any suitable key length that is known or developed in the future. In various embodiments, a CK can include a key length of 128 bits, 192 bits, or 256 bits, among other key lengths that are possible and contemplated herein.

In some embodiments, each CK includes a unique 256-bit Advanced Encryption Standard (AES-256) cipher. In additional or alternative embodiments, each CK includes a unique 192-bit Advanced Encryption Standard (AES-192) cipher. In further additional or alternative embodiments, each CK includes a unique 128-bit Advanced Encryption Standard (AES-128) cipher.

In the embodiment discussed with reference to and illustrated in FIG. 3, for example, CK1 is utilized to encrypt/decrypt the data chunk 304A to generate encrypted data CK1(data304A). Similarly, CK2 is utilized to encrypt/decrypt the data chunk 304B to generate encrypted data CK2(data304B) and CKn is utilized to encrypt/decrypt the data chunk 304n to generate encrypted data CKn(data304n).

In various embodiments, each of storage objects 302A through 302n is encrypted/decrypted with a storage object encryption key (SOK) that is different from the SOK utilized to encrypt/decrypt every other storage object 302 (e.g., a unique SOK). At least in the embodiment illustrated in FIG. 3, storage object 302A is encrypted/decrypted with SOK1 and storage object 302n is encrypted/decrypted with SOKn.

A storage object encryption key SOK can include any suitable encryption algorithm and/or technique that is known or developed in the future that can encrypt and/or decrypt a storage object 302. Further, a storage object encryption key SOK may include any suitable key length that is known or developed in the future. In various embodiments, a storage object encryption key SOK can include a key length of 128 bits, 192 bits, or 256 bits, among other key lengths that are possible and contemplated herein.

In some embodiments, each SOK includes a unique AES-256 cipher. In additional or alternative embodiments, each SOK includes a unique AES-192 cipher. In further additional or alternative embodiments, each SOK includes a unique AES-128 cipher.

In the embodiment discussed with reference to and illustrated in FIG. 3, for example, SOK1 is utilized to encrypt CK1 to generate an encrypted data chunk encryption key SOK1(CK1) associated with pointer 306A on storage object 302A and to encrypt CK2 to generate an encrypted data chunk encryption key SOK1(CK2) associated with pointer 306B1 on storage object 302A. Similarly, SOKn is utilized to encrypt CK2 to generate an encrypted data chunk encryption key SOKn(CK2) associated with pointer 306B2 on storage object 302n and to encrypt CKn to generate an encrypted data chunk encryption key SOKn(CKn) associated with pointer 306C on storage object 302n.

Encrypting a data chunk encryption key CK with a storage object encryption key SOK provides a multi-layer encryption/decryption key scheme that allows a data chunk 304 to be effectively crypto-erased. Specifically, a data chunk 304 can be crypto-erased by erasing/deleting the SOK used to encrypt the CK for the data chunk 304. That is, by erasing/deleting the SOK that encrypted the CK for the data chunk 304, the CK for the data chunk 304 remains encrypted because it can no longer be decrypted. Further, because the CK can no longer be decrypted because its SOK has been deleted/erased, the CK utilized to encrypt the data chunk 304 remains encrypted and can no longer be utilized to decrypt the data chunk 304, which results in the data chunk 304 being effectively crypto-erased.

A processor 204 may include any suitable non-volatile/persistent hardware and/or software configured to perform and/or facilitate data storage operations on the storage devices 202, including, but not limited to, data migration, data archiving, data backup, data rebuilding, data mirroring, replicating data, etc. For instance, a processor 204 may include non-volatile and/or persistent hardware and/or software to perform short-term and/or long-term data storage operations on the storage devices 202, which may include write operations, read operations, read-write operations, data migration operations, etc., among other operations that are possible and contemplated herein.

In various embodiments, a processor 204 may further include any suitable hardware and/or software that can receive I/O requests (e.g., write request, read request, and/or read-write request, etc.) from the client device(s) 104 (see FIG. 1) and perform corresponding I/O operations (e.g., write operations, read operations, and/or read-write operations, etc.) on the storage devices 202 in response thereto. In some embodiments, a processor 204 further includes hardware and/or software for executing instructions in one or more modules and/or applications that can crypto-erase data and/or effectively crypto-erase data.

With reference to FIG. 4A, FIG. 4A is block diagram of one embodiment of a processor 204A that can be included in the storage system 106A illustrated in and discussed with reference to FIG. 2. At least in the illustrated embodiment, the processor 204A includes, among other components, a data chunk encryption module 402 and a storage object encryption module 404.

A data chunk encryption module 402 may include any suitable hardware and/or software that can encrypt and/or decrypt one or more data chunks 304 stored in storage device(s) 202. A data chunk encryption module 402 can encrypt the data chunk(s) 304 utilizing any suitable encryption/decryption technique and/or process that is known or developed in the future.

Further, a data chunk encryption module 402 can use any suitable type of data chunk encryption key CK to encrypt and/or decrypt each data chunk 304. Further, a data chunk encryption module 402 can use a data chunk encryption key CK with any suitable key length that is known or developed in the future. In various embodiments, a data chunk encryption module 402 can use a data chunk encryption key CK with a key length of 128 bits, 192 bits, or 256 bits, among other key lengths that are possible and contemplated herein.

In some embodiments, a data chunk encryption module 402 can encrypt/decrypt each data chunk 304 with a data chunk encryption key CK that includes a unique AES-256 cipher. In additional or alternative embodiments, a data chunk encryption module 402 can encrypt/decrypt each data chunk 304 with a data chunk encryption key CK that includes a unique AES-192 cipher. In further additional or alternative embodiments, a data chunk encryption module 402 can encrypt/decrypt each data chunk 304 with a data chunk encryption key CK that includes a unique AES-128 cipher.

In various embodiments, a data chunk encryption module 402 is configured to encrypt/decrypt each data chunk 304 of a set of data chunks with a different data chunk encryption key CK. For example, the data chunk encryption module 402 is configured to encrypt/decrypt data chunks 304A through 304n with a unique CK that is different from the CK used to encrypt/decrypt any other data chunk 304.

Referring to the embodiment illustrated in FIG. 3, a data chunk encryption module 402 is configured to encrypt/decrypt data chunk 304A using the data chunk encryption key CK1 to generate encrypted data CK1(data304A). Further, the data chunk encryption module 402 encrypts/decrypts data chunk 304B using the data chunk encryption key CK2 to generate encrypted data CK2(data304B) and encrypts/decrypts data chunk 304n using a data chunk encryption key CKn to generate encrypted data CKn(data304n).

A storage object encryption module 404 may include any suitable hardware and/or software that can encrypt and/or decrypt one or more data chunk encryption keys CK stored on the storage object(s) 302. A storage object encryption module 404 can encrypt the data chunk encryption key(s) CK utilizing any suitable encryption/decryption technique and/or process that is known or developed in the future.

Further, a storage object encryption module 404 can use any suitable type of storage object encryption key SOK to encrypt and/or decrypt each data chunk encryption key CK. Further, a storage object encryption module 404 can use a storage object encryption key SOK with any suitable key length that is known or developed in the future. In various embodiments, a storage object encryption module 404 can use a storage object encryption key SOK with a key length of 128 bits, 192 bits, or 256 bits, among other key lengths that are possible and contemplated herein.

In some embodiments, a storage object encryption module 404 can encrypt/decrypt each CK on one or more data chunk encryption keys CK with a unique storage object encryption key SOK assigned to a storage object 302. That is, the storage object encryption module 404 can assign a different SOK to each storage object 302 so that each CK on each particular storage object 302 is encrypted/decrypted with the same SOK to generate one or more encrypted data chunk encryption keys SOK(CK), which is the encryption key to a corresponding encrypted data chunk CK(data).

In some embodiments, a storage object encryption module 404 can encrypt/decrypt one or more data chunk encryption keys CK with a storage object encryption key SOK that includes a unique AES-256 cipher. In additional or alternative embodiments, a storage object encryption module 404 can encrypt/decrypt one or more data chunk encryption keys CK with a storage object encryption key SOK that includes a unique AES-192 cipher. In further additional or alternative embodiments, a storage object encryption module 404 can encrypt/decrypt one or more data chunk encryption keys CK with a storage object encryption key SOK that includes a unique AES-128 cipher.

Referring again to the embodiment illustrated in FIG. 3, a storage object encryption module 404, in various embodiments, is configured to encrypt CK1 with SOK1 to generate the encrypted data chunk encryption key SOK1(CK1) associated with pointer 306A on storage object 302A and to encrypt CK2 with SOK1 to generate the encrypted data chunk encryption key SOK1(CK2) associated with pointer 306B1 on storage object 302A. The storage object encryption module 404 is further configured to encrypt CK2 with SOKn to generate the encrypted data chunk encryption key SOKn(CK2) associated with pointer 306B2 on storage object 302n and to encrypt CKn with SOKn to generate the encrypted data chunk encryption key SOKn(CKn) associated with pointer 306C on storage object 302n.

As discussed above, encrypting a data chunk encryption key CK with a storage object encryption key SOK provides a multi-layer encryption/decryption key scheme that allows a data chunk 304 to be effectively crypto-erased. Accordingly, in various embodiments, a processor 204A can be configured to crypto-erase one or more data chunks 304 by erasing/deleting the SOK used to encrypt the CK for a particular data chunk 304. As such, by erasing/deleting the SOK that encrypted the CK for the particular data chunk 304, the CK for the data chunk 304 remains encrypted because it can no longer be decrypted using its storage object encryption key SOK. Further, because the CK can no longer be decrypted because its SOK has been deleted/erased, the CK utilized to encrypt the data chunk 304 remains encrypted and can no longer be utilized to decrypt the data chunk 304, which results in the processor 204A being able to effectively crypto-erase the particular data chunk 304 for this particular storage object 302. Other storage objects 302 may still have access provided that each storage object 302 includes a respective pointer 306 to the data chunk 304.

Referring to FIG. 4B, FIG. 4B is block diagram of another embodiment of a processor 204B that can be included in the storage system 106A illustrated in and discussed with reference to FIG. 2. The processor 204B includes a data chunk encryption module 402 and storage object encryption module 404 similar to the processor 204A discussed elsewhere herein. At least in the illustrated embodiments, the processor 204B further includes, among other components, a deduplication module 406.

A deduplication module 406 may include any suitable hardware and/or software that can implement and/or perform one or more deduplication techniques and/or processes. In various embodiments, a deduplication module 406 can determine whether two or more data chunks 304 already stored in the storage system 106A (e.g., in one or more storage devices 202) are duplicates and/or copies of one another. In response to determining that two or more data chunks 304 already stored in the storage device(s) 202 are duplicates and/or copies of one another, a deduplication module 406 can replace each copy with a respective pointer 306 to one of the data chunks 304 (e.g., a primary data chunk 304).

In additional or alternative embodiments, a deduplication module 406 can determine whether one or more incoming data chunks 304 is a duplicate or copy of the primary data chunk 304 already stored in the storage system 106A. In response to determining that an incoming data chunk 304 is a duplicate of the primary data chunk 304 already stored in the storage system 106A, a deduplication module 406 can store the incoming data chunk as a pointer 306 to the primary data chunk 304 instead of storing the duplicate itself.

In various embodiments, to store a data chunk 304 as a pointer 306, a deduplication module 406 can transmit a request to the storage object encryption module 404 to receive the CK for the data chunk 304 corresponding to the duplicate for which the pointer 306 is being generated. In response to receiving the request, the storage object encryption module 404 can determine the storage object 302 that owns the primary data chunk 304 and decrypt the CK for the primary data chunk using the SOK of the storage object 302 that owns the primary data chunk 304.

Further, in response to determining that a data chunk 304 already stored in the storage system 106A is not a duplicate of another data chunk 304, a deduplication module 406 can facilitate maintaining storage of the data chunk 304 in the storage device(s) 202. Moreover, in response to determining that an incoming data chunk 304 is not a copy of a data chunk 304 already stored in the storage system 106A, a deduplication module 406 can facilitate storing the incoming data chunk 304 in one or more storage devices 202.

Duplicates and/or copies of data chunks 304 already stored in the storage system 106A and/or incoming data chunks that are duplicates/copies of data chunks 304 already stored in the storage system 106A may be identified and/or detected using any suitable technique and/or process that is known or developed in the future. Further, a deduplication module 406 may replace and/or store a copy of a data chunk 304 with a pointer 306 using any suitable technique and/or process that is known or developed in the future.

Figure 5:
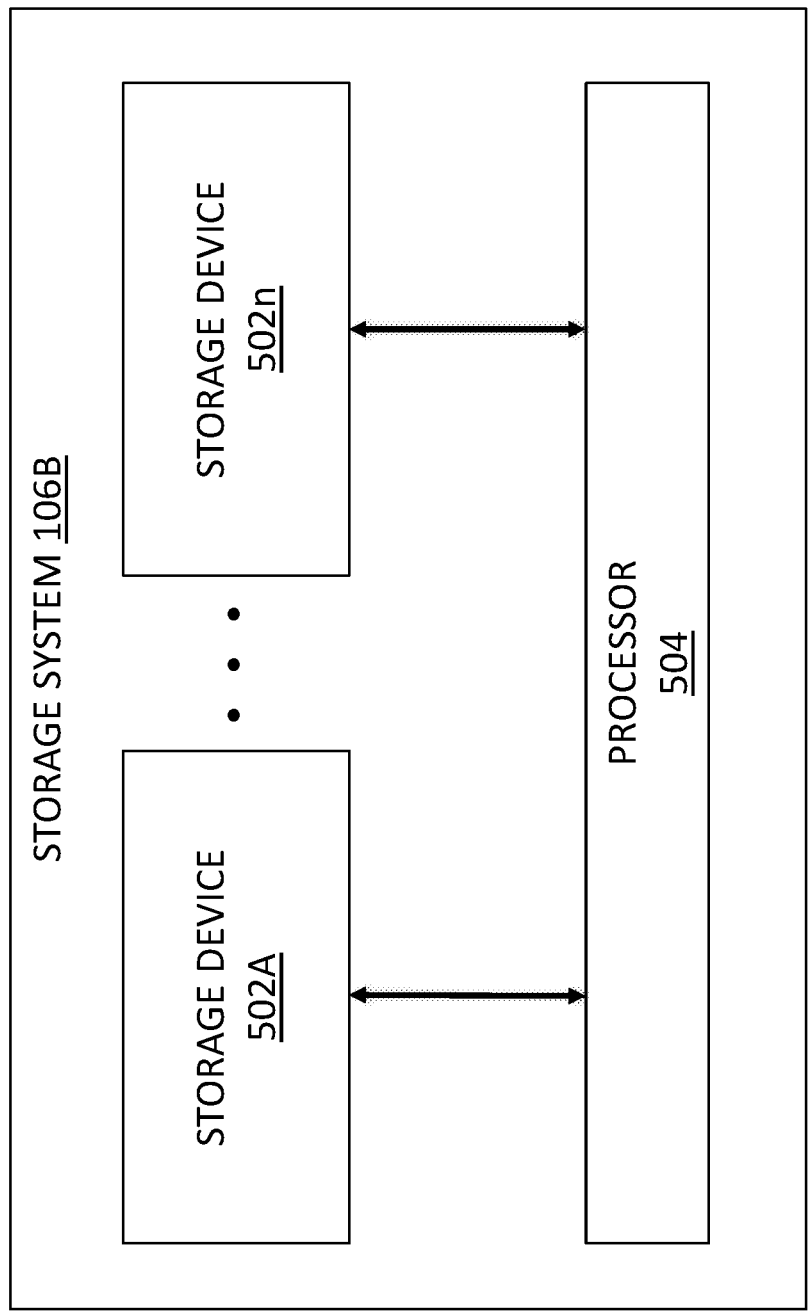
FIG. 5 is a block diagram of another embodiment of a storage system included in the storage network of FIG. 1.

With reference to FIG. 5, FIG. 5 is a block diagram of another embodiment of a storage system 106B illustrated in and discussed with reference to FIG. 1. At least in the illustrated embodiment, the storage system 106B includes, among other components, a set of storage devices 502A through 502n (also simply referred individually, in various groups, or collectively as storage device(s) 502) and a processor 504 coupled to and/or in communication with one another.

Figure 6:
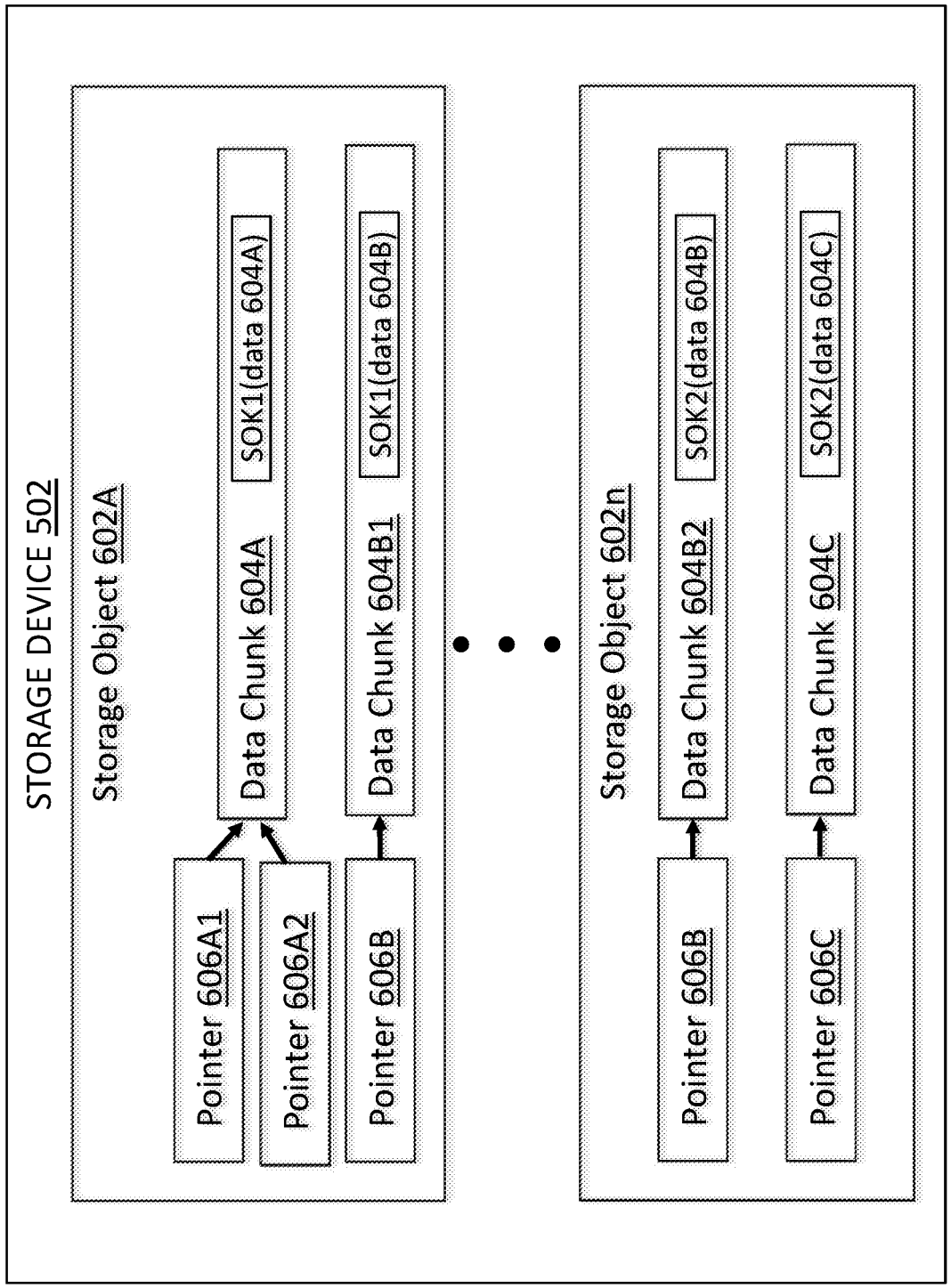
FIG. 6 is a block diagram of one embodiment of a storage device included in the storage system of FIG. 5.

With reference to FIG. 6, FIG. 6 is a block diagram of one embodiment of a storage device 502 illustrated in and discussed with reference to FIG. 5. A storage device 502 may include any suitable type of device and/or system that is known or developed in the future that can store computer-useable data. In various embodiments, a storage device 502 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

In some embodiments, a storage device 502 may be implemented as a direct-access storage device (DASD). A storage device 502, in further embodiments, may include other types of non-transitory memory such as, for example, flash memory (e.g., a solid-state devices (SSD) or other non-volatile storage devices that store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) of memory devices (e.g., non-volatile and/or persistent), etc. that are possible and contemplated herein.

A storage device 502 may include any suitable size that can provide storage space for one or more storage applications for a set of client devices 104. A storage device 502, in various embodiments, can include a size in the range of about 64 KB to about one hundred petabytes (100 PB), among other sizes that are possible and contemplated herein. In some embodiments, a storage device 502 can include a size of about one terabyte, among other sizes that are possible and contemplated herein.

At least in the illustrated embodiment, a storage device 502 can store, among other data, a plurality of storage objects 602A through 602n (also simply referred individually, in various groups, or collectively as storage object(s) 602)). In additional or alternative embodiments, a storage device 502 can store a set of data chunks 604A, 604B1, 604B2, and 604C (also simply referred individually, in various groups, or collectively as data chunk(s) 604) that are owned by and/or are associated with the storage object(s) 602.

A data chunk 604 may include any suitable chunk of data, segment of data, and/or block of data. Further, a data chunk 604 may include any suitable type of data that is known or developed in the future.

Each data chunk 604 may include any suitable size that is known or developed in the future. In various embodiments, each data chunk may include a size in the range of about 2 KB to about 64 KB, among other sizes that are possible and contemplated herein. In some embodiments, a data chunk 604 can include a size of about 8 KB, among other sizes that are possible and contemplated herein.

While the embodiment illustrated in FIG. 6 includes four data chunks 604 (e.g., data chunks 604A, 604B1, 604B2, and 604C), various other embodiments may include different quantities of data chunks 604 and is not limited to four data chunks 604. In other words, various alternative embodiments may include two or three data chunks 604 or any quantity of data chunks 604 greater than four data chunks 604.

At least in the illustrated embodiment, data chunks 604A and 604B1 are owned by the storage object 602A and data chunks 604B2 and 604C are owned by the storage object 602n. Here, data chunks 604B1 and 604B2 are duplicates of one another and are owned by different storage objects. That is, deduplication occurs within a storage object 602, but not between storage objects 602. For example, deduplication occurs with respect to storage object 602A individually and with respect to storage object 602n individually, but not with respect storage object 602A and storage object 602n collectively.

In various embodiments, each data chunk 604 is encrypted/decrypted using the unique SOK assigned to the storage object that owns it. As shown in FIG. 6, data chunks 604A and 604B1 are each encrypted/decrypted using a storage object encryption key SOK1 for the storage object 602A that is different from the SOK assigned to every other storage object (e.g., a unique SOK). Similarly, data chunks 604B2 and 604C are each encrypted/decrypted using a storage object encryption key SOK2 for the storage object 602n that is different from the SOK assigned to every other storage object (e.g., a unique SOK).

A storage object encryption key SOK may include any suitable encryption algorithm and/or technique that is known or developed in the future that can encrypt and/or decrypt a data chunk 604. Further, a storage object encryption key SOK can include any suitable key length that is known or developed in the future. In various embodiments, SOK1 and SOK2 can include a key length of 128 bits, 192 bits, or 256 bits, among other key lengths that are possible and contemplated herein.

In some embodiments, each SOK includes a unique AES-256 cipher. In additional or alternative embodiments, each SOK includes a unique AES-192 cipher. In further additional or alternative embodiments, each SOK includes a unique AES-128 cipher.

In the embodiment discussed with reference to and illustrated in FIG. 6, for example, SOK1 is utilized to encrypt/decrypt the data chunks 604A and 604B1 to generate encrypted data SOK1(data604A) and SOK1(data604B). Similarly, SOK2 is utilized to encrypt/decrypt the data chunks 604B2 and 604C to generate encrypted data SOK2(data604B) and SOK2(data604C). Here, SOK1(data604B) and SOK2(data604B) are the same data (e.g., data604B) that are encrypted with different storage object keys (e.g., SOK1 and SOK2).

At least in the illustrated embodiment, a storage object 602A can store a set of pointers 606A1, 606A2, and 606B and a storage object 602n can store a set of pointers 606B and 606C. The pointers 606A1, 606A2, and 606B on the storage object 602A and the pointers 606B and 606C on the storage object 602n may be included as a portion of a data deduplication technique and/or process. The data deduplication technique and/or process may include any suitable deduplication process/technique that is known or developed in the future that can reduce the amount of data stored in a storage device 502 by replacing one or more duplicates of a data chunk 604 with a pointer 606 to a version of the data chunk 604 (e.g., primary version of the data chunk 604 or primary data chunk 604) instead of storing the duplicate itself.

As illustrated in FIG. 6, storage object 602A includes pointers 606A1 and 606A2 that references data chunk 604A and a pointer 606B that references data chunk 604B1. Further, storage object 602B includes a pointer 606B that references data chunk 604B2 and a pointer 306C that references data chunk 604C. Here, deduplication occurs within storage object 602A individually and within storage object 602B individually, but not between storage objects 602A and 602B, which results in both storage objects 602A and 602B including respective copies of the same data (e.g., data 604B). While FIG. 6 illustrates two storage objects 602, various other storage devices 502 may include a greater quantity of storage objects 602.

Encrypting a data chunk 604 with a storage object encryption key SOK provides an encryption/decryption key scheme that allows a data chunk 604 to be effectively crypto-erased. Specifically, a data chunk 604 can be crypto-erased by erasing/deleting the SOK used to encrypt the data chunk 604. That is, by erasing/deleting the SOK that encrypted the data chunk 604, the data chunk 604 remains encrypted because it can no longer be decrypted, which results in the data chunk 604 being effectively crypto-erased.

A processor 504 may include any suitable non-volatile/persistent hardware and/or software configured to perform and/or facilitate data storage operations on the storage devices 502, including, but not limited to, data migration, data archiving, data backup, data rebuilding, data mirroring, replicating data, etc. For instance, a processor 504 may include non-volatile and/or persistent hardware and/or software to perform short-term and/or long-term data storage operations on the storage devices 502, which may include write operations, read operations, read-write operations, data migration operations, etc., among other operations that are possible and contemplated herein.

In various embodiments, a processor 504 may further include any suitable hardware and/or software that can receive I/O requests (e.g., write request, read request, and/or read-write request, etc.) from the client device(s) 104 (see FIG. 1) and perform corresponding I/O operations (e.g., write operations, read operations, and/or read-write operations, etc.) on the storage devices 502 in response thereto. In some embodiments, a processor 504 further includes hardware and/or software for executing instructions in one or more modules and/or applications that can crypto-erase data and/or effectively crypto-erase data.

Figure 7A:
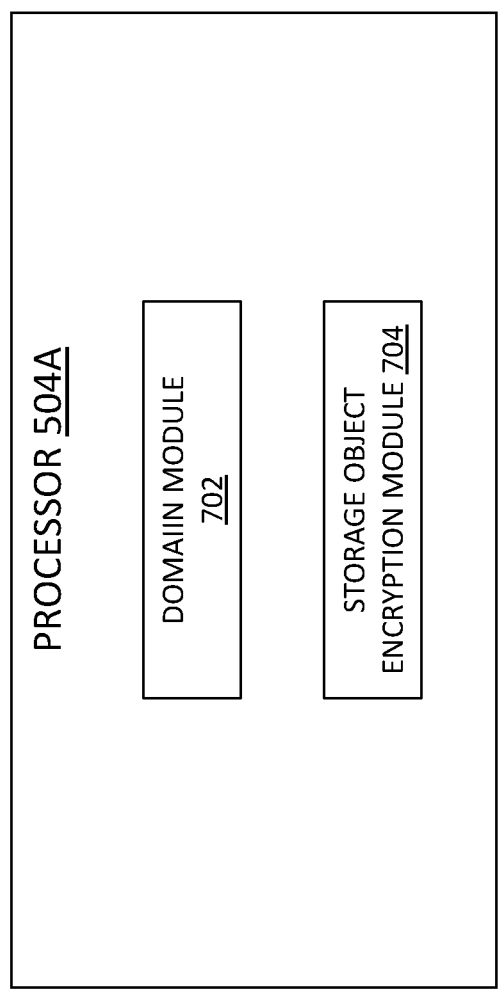
FIGS. 7A and 7B are block diagrams of various embodiments of a processor included in the storage system of FIG. 5.

With reference to FIG. 7A, FIG. 7A is block diagram of one embodiment of a processor 504A that can be included in the storage system 106B illustrated in and discussed with reference to FIG. 5. At least in the illustrated embodiment, the processor 504A includes, among other components, a domain module 702 and a storage object encryption module 704.

A domain module 702 may include any suitable hardware and/or software that can separate data access between domains. In some embodiments, a domain module 702 is configured to separate data access between storage objects 602. That is, a domain module 702 can separate access to the data chunks 604 by granting access to each respective data chunk 604 to the storage object 602 that owns the data chunk 604. In other words, a storage object 602 cannot access a data chunk 604 that it does not own.

With reference again to FIG. 6, a domain module 702 can create a first domain that includes storage object 602A and a second domain that includes storage object 602n. Here, storage object 602A is granted access to data chunks 604A and 604B1, while storage object 602n is not granted access to data chunks 604A and 604B1. Similarly, storage object 602n is granted access to data chunks 604B2 and 604C, while storage object 602n is not granted access to data chunks 604B2 and 604C. In this manner, separate client devices 104 can securely and/or separately store their respective data on the storage system 106B. For example, client device 104A can be assigned the first domain that includes storage object 602A and client device 104n can be assigned the second domain that includes storage object 602n.

While two domains are illustrated and discussed herein, the various embodiments are not limited to two domains. That is, various other embodiments many include any suitable quantity of domains greater than two domains.

By assigning each client device 104 its own domain, mixing security and management functions can be avoided. Deduplication between domains is also restricted and each domain can individually be crypto-erased. That is, secure erasing occurs at the level where the SOK resides. As discussed above, a storage object 602 can be a domain; however, in various other embodiments, a domain can include any suitable level where an SOK can reside.

With reference again to FIG. 7A, a storage object encryption module 704 may include any suitable hardware and/or software that can encrypt and/or decrypt one or more data chunks 604 stored on the storage objects 602. A storage object encryption module 704 can encrypt the data chunk (s) 604 utilizing any suitable encryption/decryption technique and/or process that is known or developed in the future.

Further, a storage object encryption module 704 can use any suitable type of storage object encryption key SOK to encrypt and/or decrypt each data chunk 604. Further, a storage object encryption module 704 can use a storage object encryption key SOK with any suitable key length that is known or developed in the future. In various embodiments, a storage object encryption module 704 can use a storage object encryption key SOK with a key length of 128 bits, 192 bits, or 256 bits, among other key lengths that are possible and contemplated herein.

In some embodiments, a storage object encryption module 704 can encrypt/decrypt the data chunks 604 on each storage object 602 with a unique storage object encryption key SOK assigned to the storage object 602. That is, the storage object encryption module 704 can assign a different SOK to each storage object 602 so that the data chunk(s) 604 on each particular storage object 602 is encrypted/decrypted with the same SOK to generate one or more encrypted data chunk encryption keys SOK, which is the encryption key to a corresponding encrypted data chunk SOK(data).

In some embodiments, a storage object encryption module 704 can encrypt/decrypt each data chunk 604 on a storage object 604 with a storage object encryption key SOK that includes a unique AES-256 cipher. In additional or alternative embodiments, a storage object encryption module 404 can encrypt/decrypt each data chunk 604 on a storage object 604 with a storage object encryption key SOK that includes a unique AES-192 cipher. In further additional or alternative embodiments, a storage object encryption module 404 can encrypt/decrypt each data chunk 604 on a storage object 604 with a storage object encryption key SOK that includes a unique AES-128 cipher.

Referring again to the embodiment illustrated in FIG. 6, a storage object encryption module 704, in various embodiments, is configured to encrypt data chunks 604A and 604B1 with SOK1 to generate the encrypted data chunks SOK1 (data604A) and SOK1(data604B) associated with pointers 606A and 606B, respectively, and on storage object 602A. The storage object encryption module 404 is further configured to encrypt data chunks 604B2 and 604C with SOK2 to generate the encrypted data chunks SOK2(data604B) and SOK2(data604C) associated with pointers 606B and 606C, respectively, and on storage object 602n.

Encrypting a data chunk 604 with a storage object encryption key SOK provides an encryption/decryption key scheme that allows a data chunk 604 to be effectively crypto-erased within its own domain. Accordingly, in various embodiments, a processor 504A can be configured to crypto-erase all of the data chunks 604 in a particular domain by erasing/deleting the SOK used to encrypt the data chunks 604. As such, by erasing/deleting the SOK that encrypted the data chunks 604 within a domain, the data chunks 604 remain encrypted within that domain because the data chunk(s) 604 can no longer be decrypted using the storage object encryption key SOK, which results in the processor 504A being able to effectively crypto-erase the data chunks 604 within a domain.

Figure 7B:
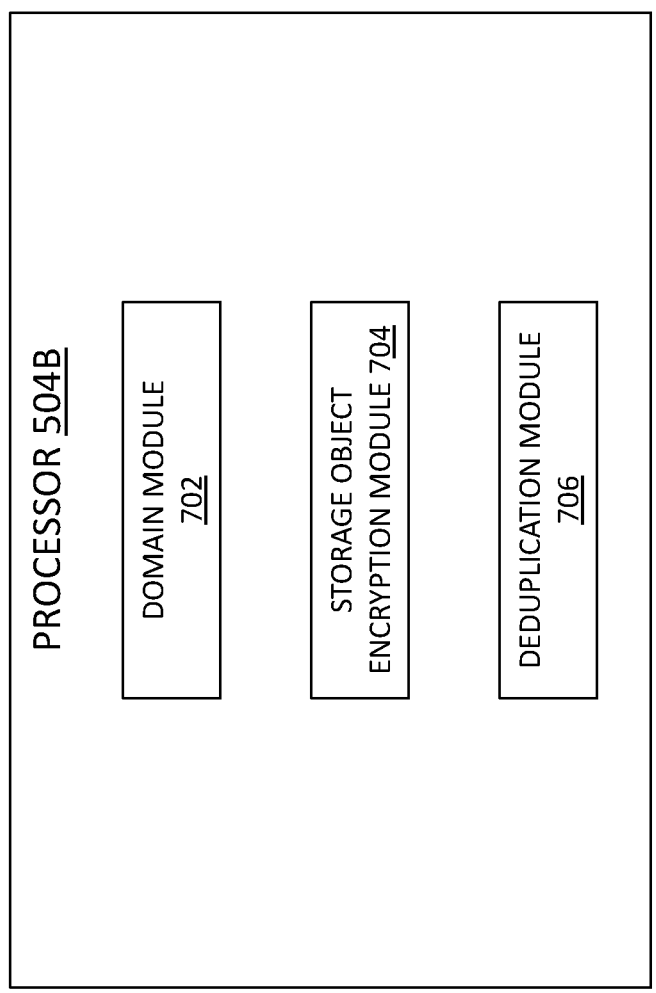

Referring to FIG. 7B, FIG. 7B is a block diagram of another embodiment of a processor 504B that can be included in the storage system 106B illustrated in and discussed with reference to FIG. 5. The processor 504B includes a domain module 702 and storage object encryption module 704 similar to the processor 504A discussed elsewhere herein. At least in the illustrated embodiments, the processor 504B further includes, among other components, a deduplication module 706.

A deduplication module 406 may include any suitable hardware and/or software that can implement and/or perform one or more deduplication techniques and/or processes. In various embodiments, a deduplication module 706 can determine whether two or more data chunks 604 already stored in each respective domain are duplicates and/or copies of one another. In response to determining that two or more data chunks 604 already stored in a particular domain are duplicates and/or copies of one another, a deduplication module 406 can replace each copy with a respective pointer 606 to one of the data chunks 604 (e.g., a primary data chunk 604).

In additional or alternative embodiments, a deduplication module 706 can determine whether one or more incoming data chunks 604 is a duplicate or copy of the primary data chunk 604 already stored in each respective domain. In response to determining that an incoming data chunk 304 is a duplicate of the primary data chunk 304 already stored in a particular domain, a deduplication module 706 can store the incoming data chunk as a pointer 606 to the primary data chunk 604 in that particular domain instead of storing the duplicate itself.

In various embodiments, to store a data chunk 604 as a pointer 606, a deduplication module 706 can transmit a request to the storage object encryption module 704 to receive the SOK for the storage object 602 corresponding to the duplicate for which the pointer 606 is being generated. In response to receiving the request, the storage object encryption module 704 transmits the SOK of the storage object 602 that owns the primary data chunk 604 to the deduplication module 706.

Further, in response to determining that a data chunk 604 already stored in a particular domain is not a duplicate of another data chunk 604, a deduplication module 706 can facilitate maintaining storage of the data chunk 604 in the domain. Moreover, in response to determining that an incoming data chunk 604 is not a copy of a data chunk 604 already stored in a particular domain, a deduplication module 706 can facilitate storing the incoming data chunk 604 in the domain of the storage object 602 that owns the incoming data chunk 604.

Duplicates and/or copies of data chunks 604 already stored in the storage system 106B and/or incoming data chunks that are duplicates/copies of data chunks 604 already stored in a particular domain may be identified and/or detected using any suitable technique and/or process that is known or developed in the future. Further, a deduplication module 706 may replace and/or store a copy of a data chunk 604 with a pointer 606 using any suitable technique and/or process that is known or developed in the future.

Figure 8:
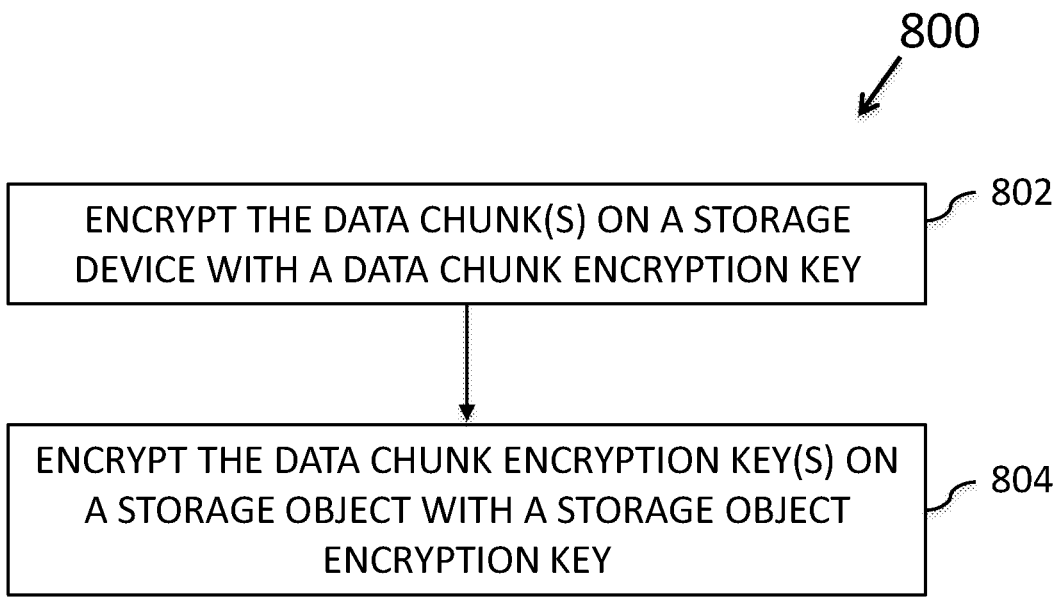
FIG. 8 is a schematic flow chart diagram illustrating one embodiment of a method for encrypting crypto-erasable data.

Referring to FIG. 8, FIG. 8 is a schematic flow chart diagram illustrating one embodiment of a method 800 for crypto-erasing data. At least in the illustrated embodiment, the method 800 can begin by a processor 204 encrypting one or more data chunks 304 on a storage device 202 with a data chunk encryption key CK to generate an encrypted data chunk CK(data) (block 802). In various embodiments, each data chunk 304 is encrypted with a unique data chunk encryption key CK.

The processor 204 further encrypts each encrypted data chunk CK(data) on a storage object 302 with a storage object encryption key SOK to generate an encrypted data chunk encryption key SOK(CK) (block 804). In various embodiments, each encrypted data chunk CK(data) is encrypted with a unique storage object encryption key SOK. In generating each encrypted data chunk encryption key SOK (CK), each encrypted data chunk CK(data) is wrapped with a storage object encryption key SOK.

Figure 9:
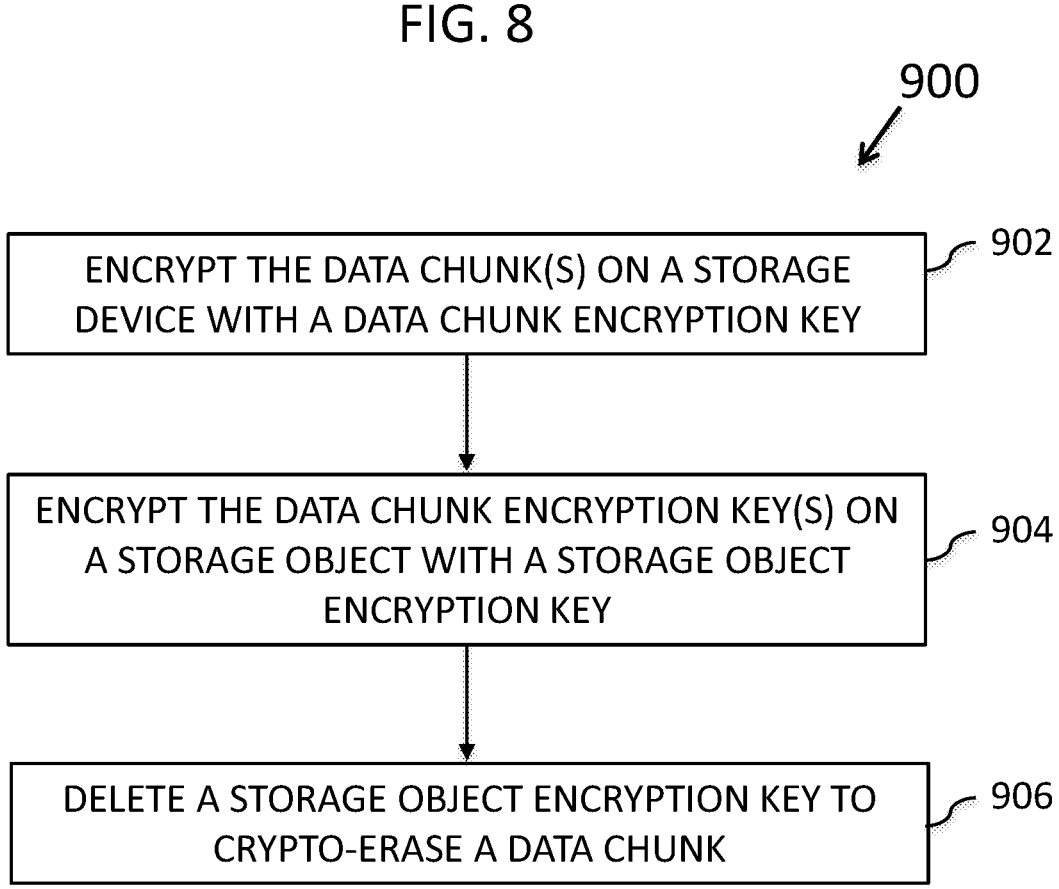
FIG. 9 is a schematic flow chart diagram illustrating another embodiment of a method for crypto-erasing data.

With reference to FIG. 9, FIG. 9 is a schematic flow chart diagram illustrating another embodiment of a method 900 for crypto-erasing data. At least in the illustrated embodiment, the method 900 can begin by a processor 204 encrypting one or more data chunks 304 on a storage device 202 with a data chunk encryption key CK to generate an encrypted data chunk CK(data) (block 902) and encrypting each encrypted data chunk CK(data) on a storage object 302 with a storage object encryption key SOK to generate an encrypted data chunk encryption key SOK(CK) (block 904).

The processor 204 further deletes a storage object encryption key SOK (block 906). In some embodiments, a data chunk 304 can be effectively removed from the storage device 202 by deleting the storage object encryption key SOK. In other words, by deleting the storage object encryption key SOK the processor 204 crypto-erases a data chunk 304 from a storage device 202.

Figure 10:
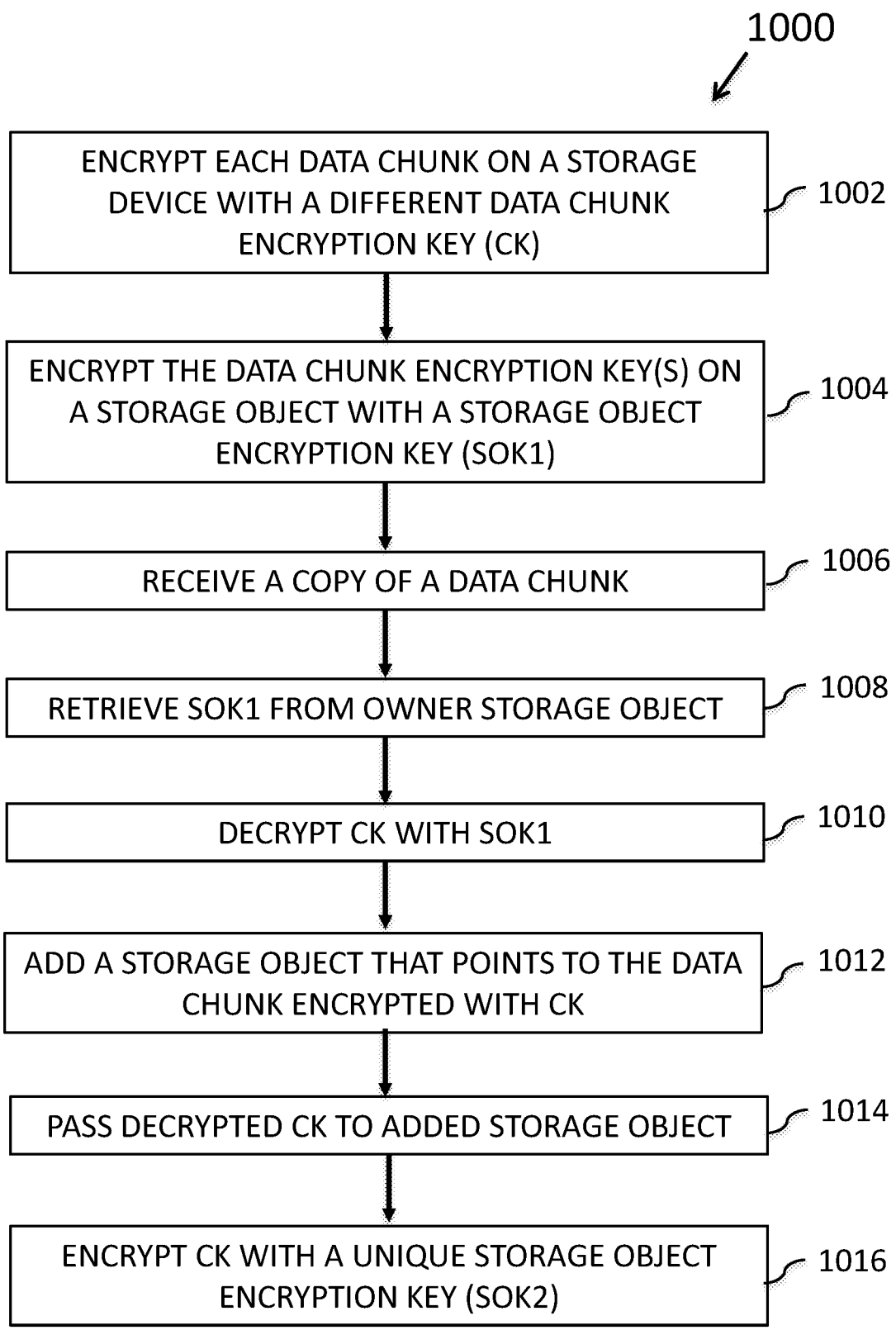
FIG. 10 is a schematic flow chart diagram illustrating one embodiment of a method for adding data that can be crypto-erased.

FIG. 10, which is described with reference to FIG. 3, is a schematic flow chart diagram illustrating one embodiment of a method 1000 for adding data to a storage device 202 that can be crypto-erased. At least in the illustrated embodiment, the method 1000 can begin by a processor 204 encrypting one or more data chunks 304 on a storage device 202 with a data chunk encryption key CK to generate an encrypted data chunk CK(data) (block 1002) and encrypting each encrypted data chunk CK(data) on a storage object 302 with a storage object encryption key SOK1 to generate an encrypted data chunk encryption key SOK1(CK) (block 1004).

Further, the processor 204 receives a data chunk 304 and determines that the received data chunk 304 is a copy of a data chunk 304 that is already stored on the storage device 202 (block 1006). In response to determining that the received data chunk 304 is a copy of a data chunk 304 that is already stored on the storage device 202, the processor 204 retrieves the storage object encryption key SOK1 from the storage object 302 that owns the chunk 304 that already stored on the storage device 202 (block 1008).

The processor 204 further decrypts the data chunk encryption key CK with the storage object encryption key SOK1 (block 1010). In addition, the processor 204 adds a storage object 302 with a pointer 306 to the storage device 202 that points (e.g., via a pointer 306) to a data chunk 304 encrypted with a unique data chunk encryption key CK (block 1012). Further, the decrypted data chunk encryption key CK is passed to the added storage object 302 (block 1014) and the processor 204 encrypts the unique data chunk encryption key CK with a unique storage object encryption key SOK (block 1016). As discussed elsewhere herein, encrypting the unique data chunk encryption key CK with the unique storage object encryption key SOK generates an encrypted data chunk encryption key SOK(CK).

Figure 11:
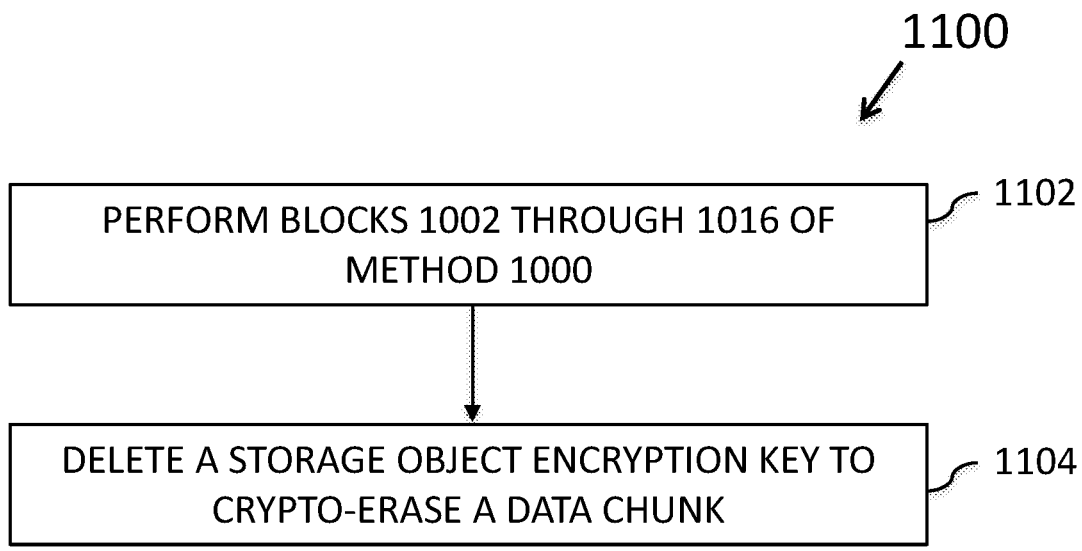
FIG. 11 is a schematic flow chart diagram illustrating another embodiment of a method for crypto-erasing data.

With reference to FIG. 11, FIG. 11 is a schematic flow chart diagram illustrating one embodiment of a method 1100 for crypto-erasing data. At least in the illustrated embodiment, the method 1100 can begin by a processor 204 perform the method 1000 illustrated in and discussed with reference to FIG. 10 (block 1102). The processor 204 further deletes a storage object encryption key SOK (block 1104).

In some embodiments, by deleting the storage object encryption key SOK the processor 204 removes a storage object 302 from the storage device 202. That is, by deleting the storage object encryption key SOK the processor 204 crypto-erases a data chunk 304 from a storage device 202. In other words, deleting the storage object encryption key SOK is a crypto-erase of all of the data chunks 304 on a storage object 302.

In FIG. 3, for example, deleting the storage object encryption key SOK1 is a crypto-erase of data chunks 304A and 304B on storage object 302A. Likewise, deleting the storage object encryption key SOKn is a crypto-erase of data chunks 304B and 304n on storage object 302n.

Figure 12:
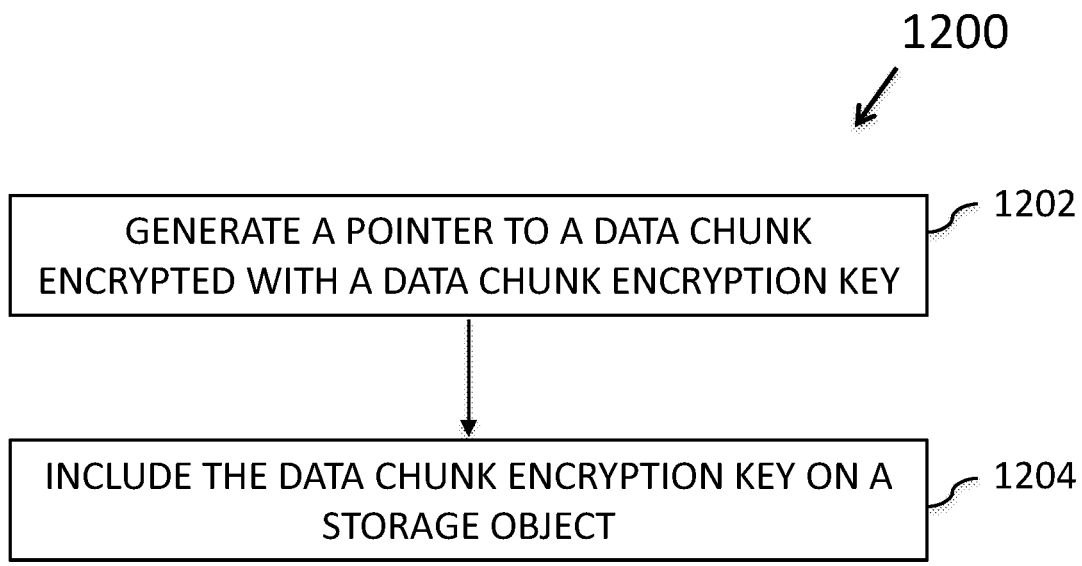
FIG. 12 is a schematic flow chart diagram illustrating one embodiment of a method for adding a storage object pointing to crypto-erasable data.

Referring to FIG. 12, FIG. 12 is a schematic flow chart diagram illustrating one embodiment of a method 1200 for adding a storage object 302 pointing to crypto-erasable data. At least in the illustrated embodiment, the method 1200 can begin by a processor 204 generating, on a storage object 302, a pointer 306 to a data chunk 304 encrypted with a unique data chunk encryption key CK (e.g., an encrypted data chunk CK(data)) (block 1202).

The processor 204 includes the unique data chunk encryption key CK on the storage object 302 (block 1204). Including the unique data chunk encryption key CK on the storage object 302 enables the processor 204 to encrypt the unique data chunk encryption key CK with a storage object encryption key SOK to generate an encrypted unique data chunk encryption key SOK(CK) for the data chunk on the storage object 302.

Figure 13:
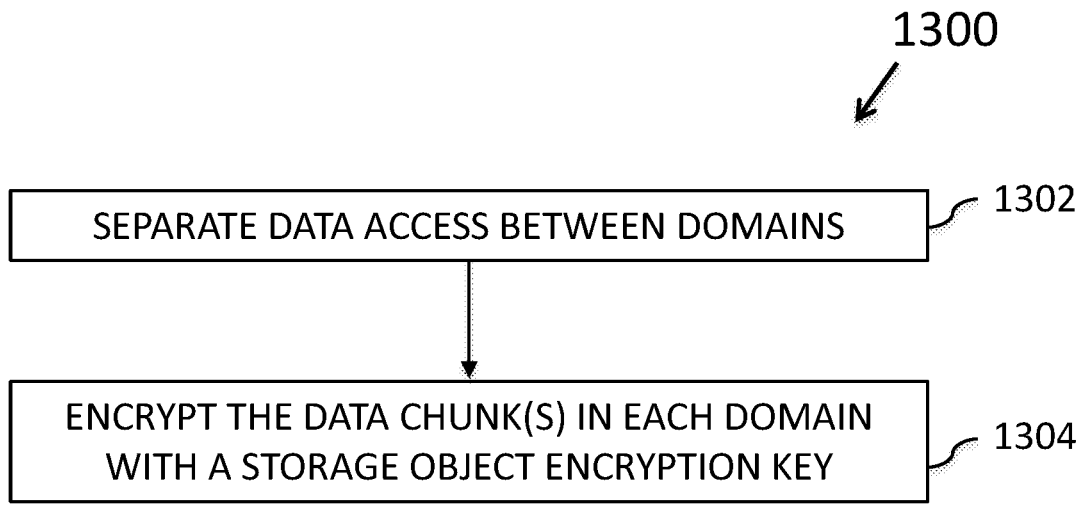
FIG. 13 is a schematic flow chart diagram illustrating another embodiment of a method for crypto-erasing data.

With reference to FIG. 13, FIG. 13 is a schematic flow chart diagram illustrating another embodiment of a method 1300 for crypto-erasing data. At least in the illustrated embodiment, the method 1300 can begin by a processor 504 separating data access between multiple domains (block 1302). In some embodiments, separating data access between multiple domains includes the processor 504 granting access to each respective data chunk 604 on a storage device 502 to the storage object 602 that owns the data chunk 604. In other words, a storage object 602 cannot access a data chunk 604 that it does not own.

The processor 504 encrypts the set of data chunks 604 in each domain with a unique storage object encryption key SOK assigned to each respective storage object 602 (block 1304). In some embodiments, each domain includes a respective storage object 602 and each data chunk 604 that is pointed to (e.g., via a pointer 606) by the storage object 602 is encrypted with the same unique storage object encryption key SOK assigned to its storage object 602.

Figure 14:
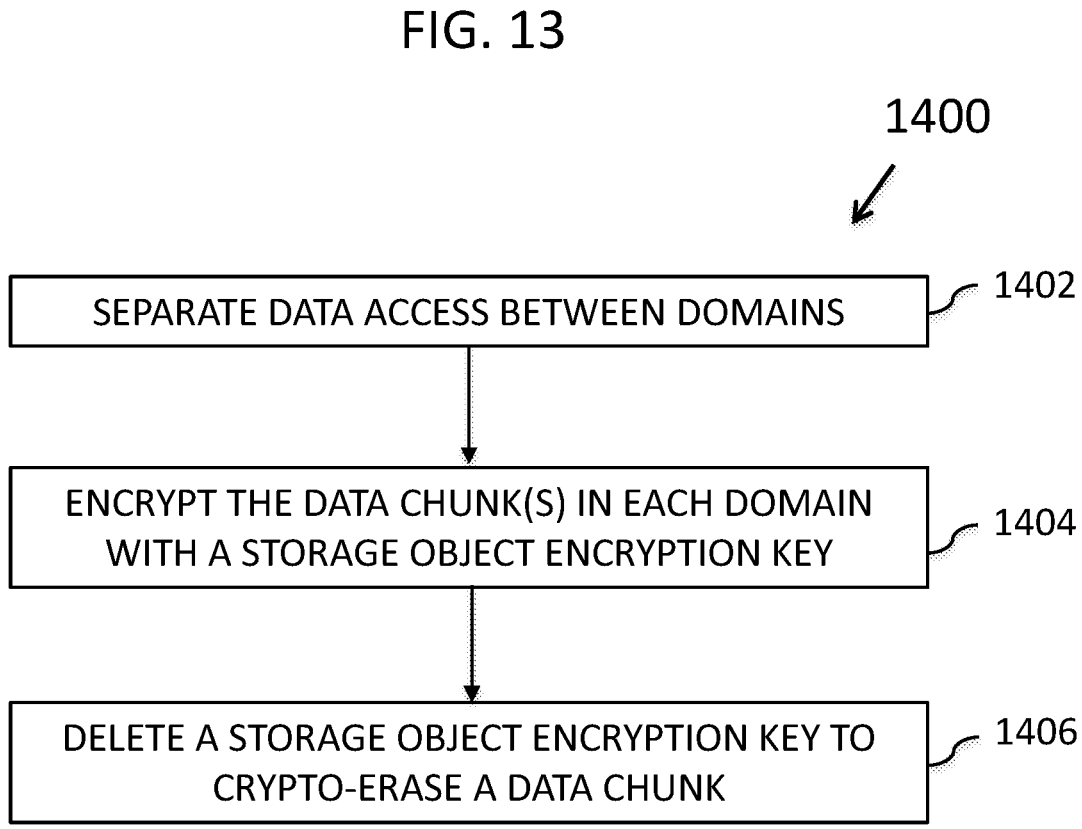
FIG. 14 is a schematic flow chart diagram illustrating yet another embodiment of a method for crypto-erasing data.

Referring to FIG. 14, FIG. 14 is a schematic flow chart diagram illustrating another embodiment of a method 1400 for crypto-erasing data. At least in the illustrated embodiment, the method 1400 can begin by a processor 504 separating data access between multiple domains (block 1402). In some embodiments, separating data access between multiple domains includes the processor 504 granting access to each respective data chunk 604 on a storage device 502 to the storage object 602 that owns the data chunk 604. In other words, a storage object 602 cannot access a data chunk 604 that it does not own.

The processor 504 encrypts the set of data chunks 604 in each domain with a unique storage object encryption key SOK assigned to each respective storage object 602 (block 1404). In some embodiments, each domain includes a respective storage object 602 and each data chunk 604 that is pointed to (e.g., via a pointer 606) by the storage object 602 is encrypted with the same unique storage object encryption key SOK assigned to its storage object 602.

Further, the processor 504 deletes a storage object encryption key SOK (block 1406). In some embodiments, by deleting the storage object encryption key SOK the processor 504 removes a storage object 602 from the storage device 502. That is, by deleting the storage object encryption key SOK the processor 504 crypto-erases a data chunk 604 from a storage device 502. In other words, deleting the storage object encryption key SOK is a crypto-erase of all of the data chunks 604 on a storage object 602.

In FIG. 6, for example, deleting the storage object encryption key SOK1 is a crypto-erase of data chunks 604A and 604B on storage object 302A. Likewise, deleting the storage object encryption key SOK2 is a crypto-erase of data chunks 604B and 604C on storage object 602n.

Figure 15:
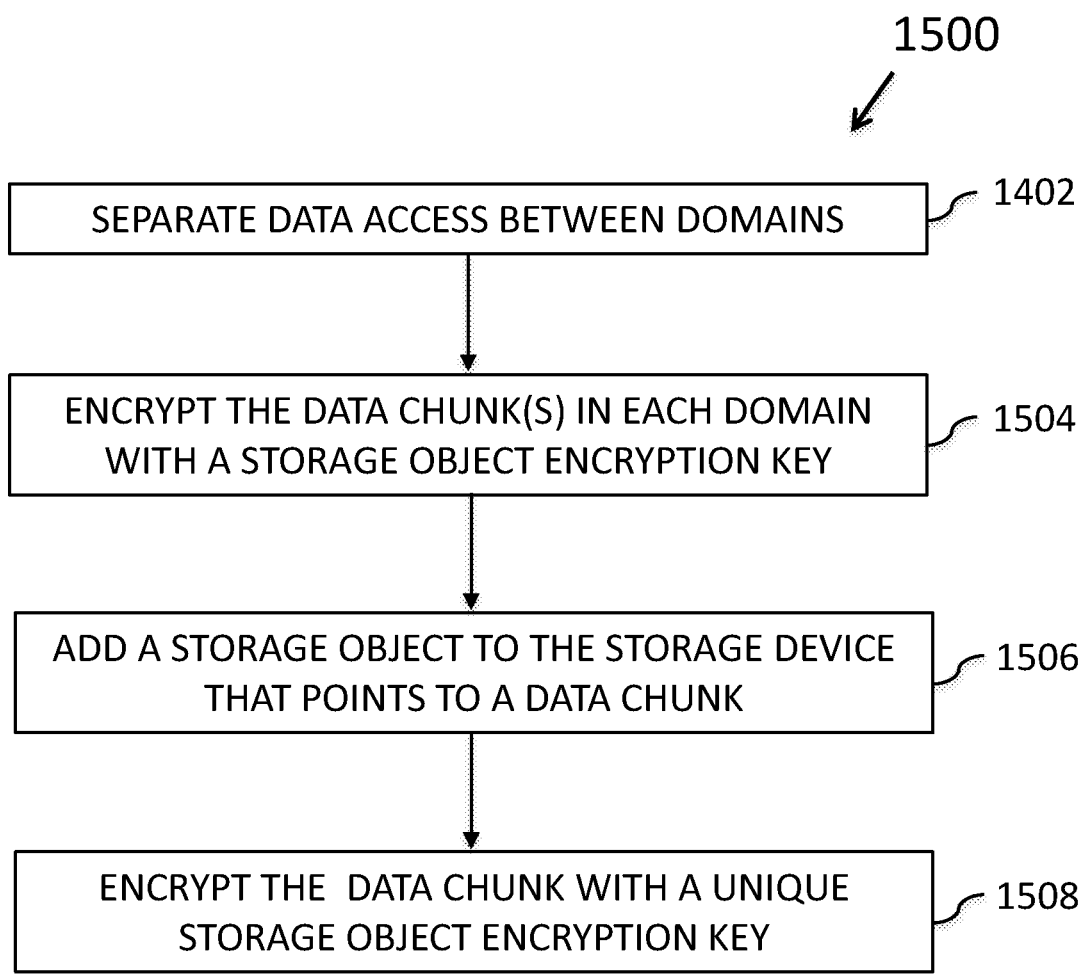
FIG. 15 is a schematic flow chart diagram illustrating another embodiment of a method for adding data that can be crypto-erased.

With reference to FIG. 15, FIG. 15 is a schematic flow chart diagram illustrating another embodiment of a method 1500 for adding data that can be crypto-erased. At least in the illustrated embodiment, the method 1500 can begin by a processor 504 separating data access between multiple domains (block 1502). In some embodiments, separating data access between multiple domains includes the processor 504 granting access to each respective data chunk 604 on a storage device 502 to the storage object 602 that owns the data chunk 604. In other words, a storage object 602 cannot access a data chunk 604 that it does not own.

The processor 504 encrypts the set of data chunks 604 in each domain with a unique storage object encryption key SOK assigned to each respective storage object 602 (block 1504). In some embodiments, each domain includes a respective storage object 602 and each data chunk 604 that is pointed to (e.g., via a pointer 606) by the storage object 602 is encrypted with the same unique storage object encryption key SOK assigned to its storage object 602.

Further, the processor 504 adds a storage object 602 with a pointer 606 to the storage device 502 that points (e.g., via a pointer 606) to a data chunk 604 (block 1506). The processor 504 further encrypts the data chunk 604 with a unique storage object encryption key SOK (block 1508). Encrypting the data chunk 604 with the unique storage object encryption key SOK generates an encrypted data chunk SOK(data).

Figure 16:
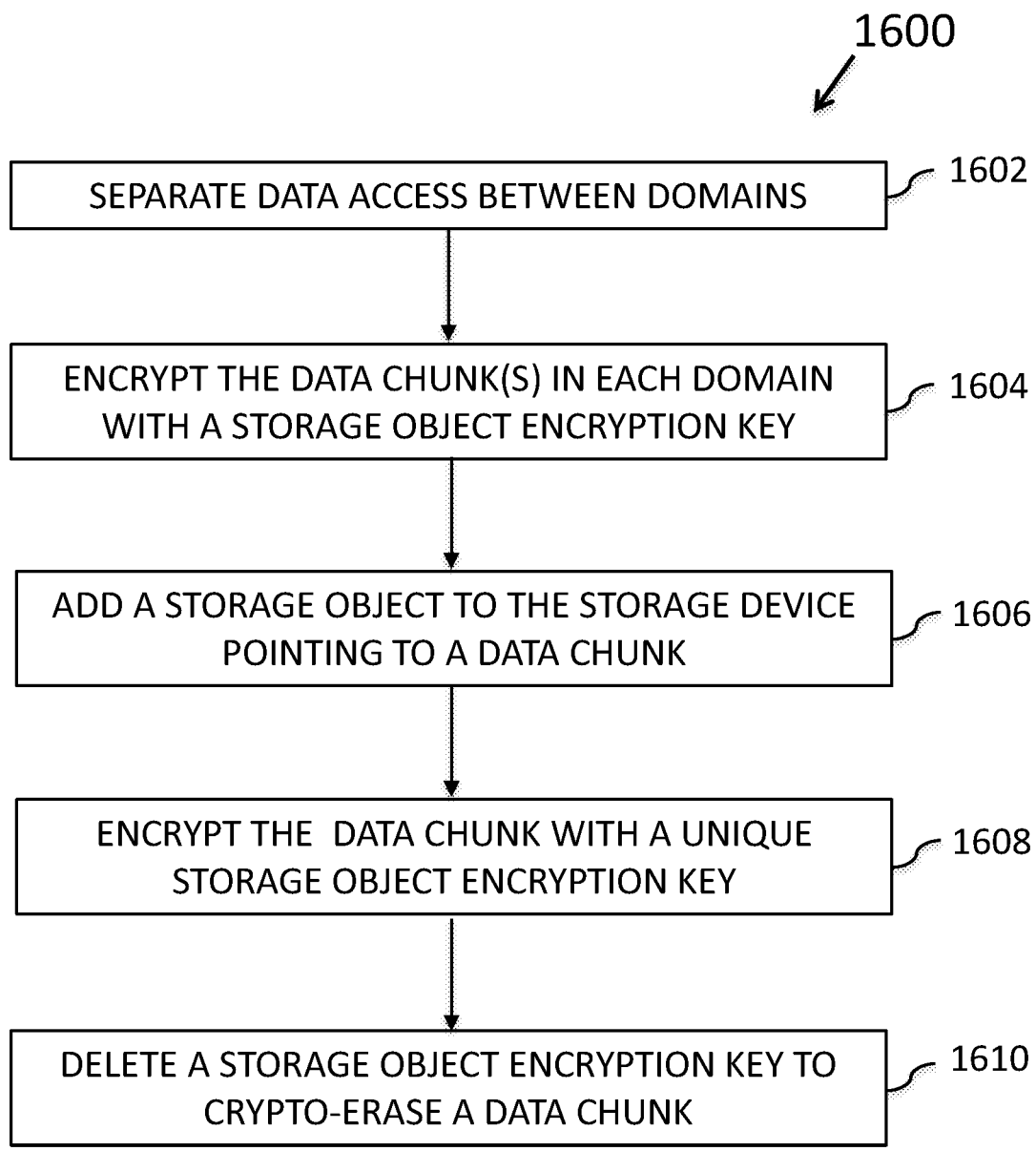
FIG. 16 is a schematic flow chart diagram illustrating still another embodiment of a method for crypto-erasing data.

Referring to FIG. 16, FIG. 16 is a schematic flow chart diagram illustrating another embodiment of a method 1600 for crypto-erasing data. At least in the illustrated embodiment, the method 1600 can begin by a processor 504 separating data access between multiple domains (block 1602). In some embodiments, separating data access between multiple domains includes the processor 504 granting access to each respective data chunk 604 on a storage device 502 to the storage object 602 that owns the data chunk 604. In other words, a storage object 602 cannot access a data chunk 604 that it does not own.

The processor 504 encrypts the set of data chunks 604 in each domain with a unique storage object encryption key SOK assigned to each respective storage object 602 (block 1604). In some embodiments, each domain includes a respective storage object 602 and each data chunk 604 that is pointed to (e.g., via a pointer 606) by the storage object 602 is encrypted with the same unique storage object encryption key SOK assigned to its storage object 602.

Further, the processor 504 adds a storage object 602 with a pointer 606 to the storage device 502 that points (e.g., via a pointer 606) to a data chunk 604 (block 1606). The processor 504 further encrypts the data chunk 604 with a unique storage object encryption key SOK (block 1608). Encrypting the data chunk 604 with the unique storage object encryption key SOK generates an encrypted data chunk SOK(data).

The processor 504 further deletes a storage object encryption key SOK (block 1610). In some embodiments, by deleting the storage object encryption key SOK the processor 504 removes a storage object 602 from the storage device 502. That is, by deleting the storage object encryption key SOK the processor 504 crypto-erases a data chunk 604 from a storage device 502.

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. An apparatus, comprising:
   a first encryption module that encrypts each data chunk on a storage device with a unique first encryption key that is different from each other first encryption key; and
   a second encryption module that encrypts each storage object on the storage device with a unique second encryption key that is different from each first encryption key and each other second encryption key,
   wherein:
      each storage object stores at least one pointer to a respective data chunk,
      each pointer includes the unique first encryption key associated with its respective data chunk,
      each unique second encryption key encrypts each pointer on its respective storage object with a same unique second encryption key to encrypt each respective unique first encryption key for each respective data chunk including a corresponding pointer on the respective storage object with the same unique second encryption key, and
      at least a portion of said modules comprise one or more of a set of hardware circuits, a set of programmable hardware devices, and executable code stored on a set of non-transitory computer-readable storage media.

2. The apparatus of claim 1, wherein:
   the storage device includes a first storage object; and
   the apparatus further comprises a deduplication module that crypto-erases a first data chunk from the storage device by deleting a respective second encryption key for a first pointer associated with the first data chunk.

3. The apparatus of claim 2, wherein:
   the deduplication module is further configured to add a storage object to the storage device by:
      generating a second storage object,
      generating a second pointer to a second data chunk stored on the storage device, the second pointer including the unique first encryption key corresponding to the second data chunk, and
      including the second pointer in the second storage object; and
   the second encryption module is further configured to encrypt the second pointer including the unique first encryption key corresponding to the second data chunk with a respective unique second encryption key associated with the second storage object.

4. The apparatus of claim 3, wherein, in generating the second pointer including the unique first encryption key corresponding to the second data chunk in the second storage object, the deduplication module is further configured to obtain the unique first encryption key corresponding to the second data chunk from another storage object that owns the second data chunk.

5. The apparatus of claim 1, wherein:
   the apparatus further comprises a deduplication module; and
   the deduplication module is further configured to add a storage object to the storage device by:
      generating a pointer to a data chunk stored on the storage device, the pointer including the unique first encryption key corresponding to the data chunk, and including the pointer in the added storage object; and
   the second encryption module is further configured to encrypt the pointer including the unique first encryption key corresponding to the data chunk with a respective unique second encryption key associated with the added storage object.

6. The apparatus of claim 5, wherein, in generating the pointer including the unique first encryption key corresponding to the data chunk in the added storage object, the deduplication module is further configured to obtain the unique first encryption key corresponding to the data chunk from another storage object that owns the data chunk.

7. The apparatus of claim 1, wherein:
   the storage device stores a data chunk, a first storage object, and a second storage object;
   the first encryption module is configured to encrypt the data chunk with a respective unique first encryption key;
   the deduplication module is configured to:
      generate a first pointer to the data chunk on the first storage object, and
      generate a second pointer to the data chunk on the second storage object; and
   the second encryption module is configured to:
      encrypt the first pointer on the first storage object with a first unique second encryption key corresponding to the first storage object, and
      encrypt the second pointer on the second storage object with a second unique second encryption key corresponding to the second storage object.

8. A method, comprising:
   encrypting, by a processor, each data chunk on a storage device with a unique first encryption key that is different from each other first encryption key; and
   encrypting each storage object on the storage device with a unique second encryption key that is different from each first encryption key and each other second encryption key,
   wherein:
      each storage object stores at least one pointer to a respective data chunk,
      each pointer includes the unique first encryption key associated with its respective data chunk, and
      each unique second encryption key encrypts each on its respective storage object with a same unique second encryption key to encrypt each respective unique first encryption key for each respective data chunk including a corresponding pointer on the respective storage object with the same unique second encryption key.

9. The method of claim 8, wherein:
   the storage device includes a first storage object; and
   the method further comprises crypto-erasing a first data chunk from the storage device by deleting a respective second encryption key for a first pointer associated with the first data chunk.

10. The method of claim 9, further comprising:
    adding a storage object to the storage device by:
       generating a second storage object, generating a second pointer to a second data chunk stored on the storage device, the second pointer including the unique first encryption key corresponding to the second data chunk, and including the second pointer in the second storage object; and encrypting the second pointer including the unique first encryption key corresponding to the second data chunk with a respective unique second encryption key associated with the second storage object.

11. The method of claim 10, wherein generating the second pointer including the first encryption key corresponding to the second data chunk in the second storage object comprises obtaining the unique first encryption key corresponding to the second data chunk from another storage object that owns the second data chunk.

12. The method of claim 8, further comprising:

adding a first storage object to the storage device by:

generating a pointer to a data chunk stored on the storage device, the pointer including the unique first encryption key corresponding to the data chunk, and including the pointer in the added storage object; and encrypting the pointer including the unique first encryption key corresponding to the data chunk with a respective unique second encryption key associated with the added storage object.

13. The method of claim 12, wherein generating the pointer including the unique first encryption key corresponding to the data chunk in the added storage object comprises obtaining the unique first encryption key corresponding to the data chunk from another storage object that owns the data chunk.

14. The method of claim 8, wherein:

the storage device stores a data chunk, a first storage object, and a second storage object; and the method further comprises:

encrypting the data chunk with a respective unique first encryption key, generating a first pointer to the data chunk on the first storage object, generating a second pointer to the data chunk on the second storage object, encrypting the first pointer on the first storage object with a first unique second encryption key corresponding to the first storage object, and encrypting the second pointer on the second storage object with a second unique second encryption key corresponding to the second storage object.

15. A computer program product comprising a computer-readable storage medium including program instructions embodied therewith, the program instructions executable by a processor to cause the processor to:

encrypt each data chunk on a storage device with a unique first encryption key that is different from each other first encryption key; and encrypt each storage object on the storage device with a unique second encryption key that is different from each first encryption key and each other second encryption key, wherein:

each storage object stores at least one pointer to a respective data chunk, each pointer includes the unique first encryption key associated with its respective data chunk, and each unique second encryption key encrypts each pointer on its respective storage object with a same unique second encryption key to encrypt each respective unique first encryption key for each respective data chunk including a corresponding pointer on the respective storage object with the same unique second encryption key.

16. The computer program product of claim 15, wherein:

the storage device includes a first storage object; and the processor is further configured to crypto-erase a first data chunk from the storage device by deleting a respective second encryption key for a first pointer associated with the first data chunk.

17. The computer program product of claim 16, wherein the processor is further configured to:

add a second storage object to the storage device by:

generating a second storage object, generating a second pointer to a second data chunk stored on the storage device, the second pointer including the unique first encryption key corresponding to the second data chunk, and including the second pointer in the second storage object; and encrypt the second pointer including the unique first encryption key corresponding to the second data chunk with a respective unique second encryption key associated with the second storage object.

18. The computer program product of claim 17, wherein, in generating the second pointer including the unique first encryption key corresponding to the second data chunk in the second storage object, the processor is further configured to obtain the unique first encryption key corresponding to the second data chunk from another storage object that owns the second data chunk.

19. The computer program product of claim 15, wherein the processor is further configured to:

add a storage object to the storage device by:

generating a pointer to a data chunk stored on the storage device, the pointer including the unique first encryption key corresponding to the data chunk, and including the pointer in the added storage object; and encrypt the pointer including the unique first encryption key corresponding to the data chunk with a respective unique second encryption key associated with the added storage object, wherein, in generating the pointer including the unique first encryption key corresponding to the data chunk in the added storage object, the processor is configured to obtain the unique first encryption key corresponding to the data chunk from another storage object that owns the data chunk.

20. The computer program product of claim 15, wherein:

the storage device stores a data chunk, a first storage object, and a second storage object; and the processor is further configured to:

encrypt the data chunk with a respective unique first encryption key, generate a first pointer to the data chunk on the first storage object, generate a second pointer to the data chunk on the second storage object, encrypt the first pointer on the first storage object with a first unique second encryption key corresponding to the first storage object, and encrypt the second pointer on the second storage object with a second unique second encryption key corresponding to the second storage object.

\* \* \* \* \*